Figure 1:
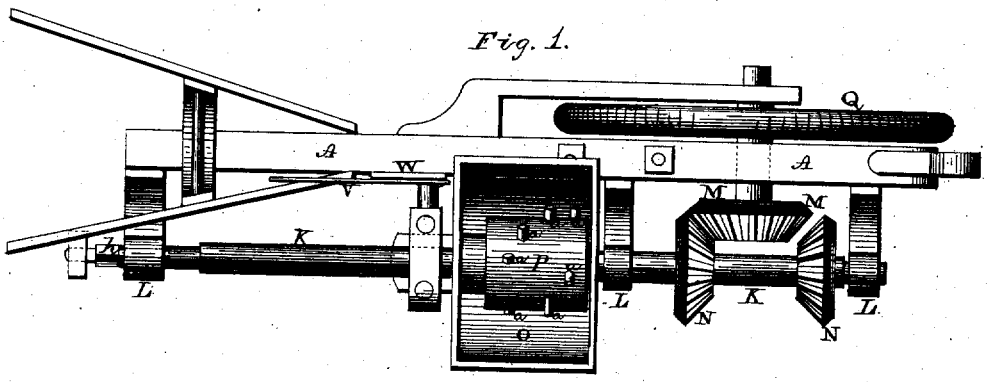
Figure 2:
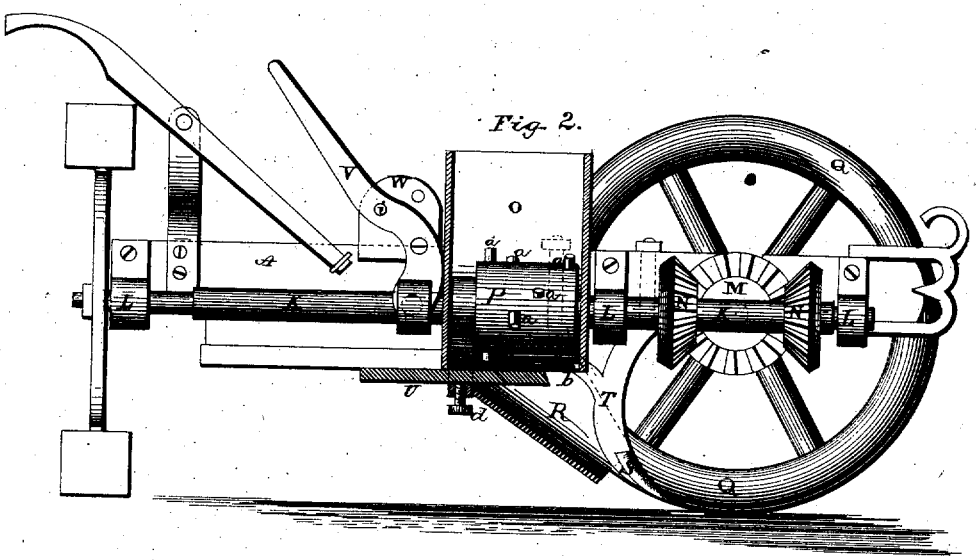

A. G. W. FOSTER.

Cotton-Planters.

No. 6,055. Reissued Sept. 22, 1874.

WITNESSES.

Frank Blaney

J. Wm. Garner

INVENTOR.

A. G. W. Foster per

F. A. Lehmann atty

THE GRAPHIC CO. PHOTO-LITH. 39 & 41 PARK PLACE, N.Y.

UNITED STATES PATENT OFFICE.

ABRAHAM G. W. FOSTER, OF NEWNAN, GEORGIA.

IMPROVEMENT IN COTTON-PLANTERS.

Specification forming part of Letters Patent No. 108,580, dated October 25, 1870; reissue No. 6,055, dated September 22, 1874; application filed August 17, 1874.

DIVISION B.

*To all whom it may concern:*

Be it known that I, ABRAHAM G. W. FOSTER, of Newnan, in the county of Coweta and State of Georgia, have invented certain new and useful Improvements in Cotton-Planters; and do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention consists in the construction and arrangement of a seeding attachment for cultivators for planting cotton or other seed, and for distributing fertilizers, as will be hereinafter more fully set forth.

In order to enable others skilled in the art to which my invention appertains to make and use the same, I will now proceed to describe its construction and operation, referring to the annexed drawing, which represents my invention.

A represents the beam of a cultivator, provided with suitable handles, plow-standards, and plows for the purposes for which the machine is intended. K represents a shaft extending along the side of the beam A, and supported and revolving in suitable bearings formed in arms or brackets L attached to said beam. M is a large bevel-gear wheel attached to one end of a short shaft which passes through the forward end of the beam A, and to the other end of said shaft is attached the drive-wheel Q, which rolls along the surface of the ground, and, by its revolution, gives motion to the shaft K through the gear-wheels M N. To the forward part of the shaft K are attached two small bevel-gear wheels, N, at such a distance apart that, when either of them is in gear with the gear-wheel M, the other may revolve without touching said wheel M, and also so that they may be so set that neither shall touch it when the shaft K will remain stationary. The shaft K passes through the seed-hopper O, and to it, within said hopper, is attached a cylinder, P, to which are attached two or more rows of teeth, *a a*, set spirally in the cylinder, which teeth, as the shaft K is revolved, stir up the seed in the hopper O, and cause it to pass out, through the discharge-opening *b* in the forward part of the bottom of said hopper, into the discharge-spout R, by which it is conducted to the ground just in the rear of the furrowing-plow S, the standard T of which is attached to the beam A a little in front of the hopper O.

The size of the discharge-opening *b* in the bottom of the hopper O is adjusted according to the size of the seed to be planted, or the character of the guano or other fertilizer to be distributed, by means of a slide, U, which forms the bottom of the hopper, and is held at any point desired by a set-screw, *d*, as shown.

The shaft K is moved longitudinally, to throw one or the other of the bevel-gear wheels N into gear with the gear-wheel M, by means of a lever, V, which is pivoted to the beam A, and the lower end of which is connected with the shaft K. This change is effected to adjust the cylinder P in the hopper O, so as to stir the seed or fertilizing material just over the delivery-opening *b*, or at a point slightly removed from it. Thus the teeth *a* of the cylinder will break up any lumps which impede the steady exit of such seed and fertilizing material.

To the lever V is attached a pin, *i*, which enters holes in a catch bar or plate, W, attached to the beam A, to hold the said lever securely in any position into which it may be adjusted.

Upon the rear end of the shaft K is formed a square tenon, *h*, which adapts it to form a suitable connection with a rotary chopper, (any former of chopper may be employed,) and thus the machine temporarily adapted to operate as a cotton-chopper.

Having thus fully described my invention, what I claim as new, and desire to secure by Letters Patent, is—

1. The toothed cylinder P, attached to the geared shaft K, and adjustably longitudinally in the seed-hopper O, substantially as and for the purposes herein set forth.

2. The combination, with a cultivator, of the longitudinally-adjustable shaft K, toothed cylinder P, hopper O, discharge-spout R, plow S, gear-wheels N N on the shaft K, and the gear-wheel M on the shaft of the drive-wheel Q, all constructed substantially as and for the purposes herein set forth.

In testimony that I claim the foregoing I have hereunto set my hand this 5th day of August, 1874.

ABRAHAM G. W. FOSTER.

Witnesses:

E. D. FOUSE,

JAS. M. GLASS.